United States Patent Office 3,814,655
Patented June 4, 1974

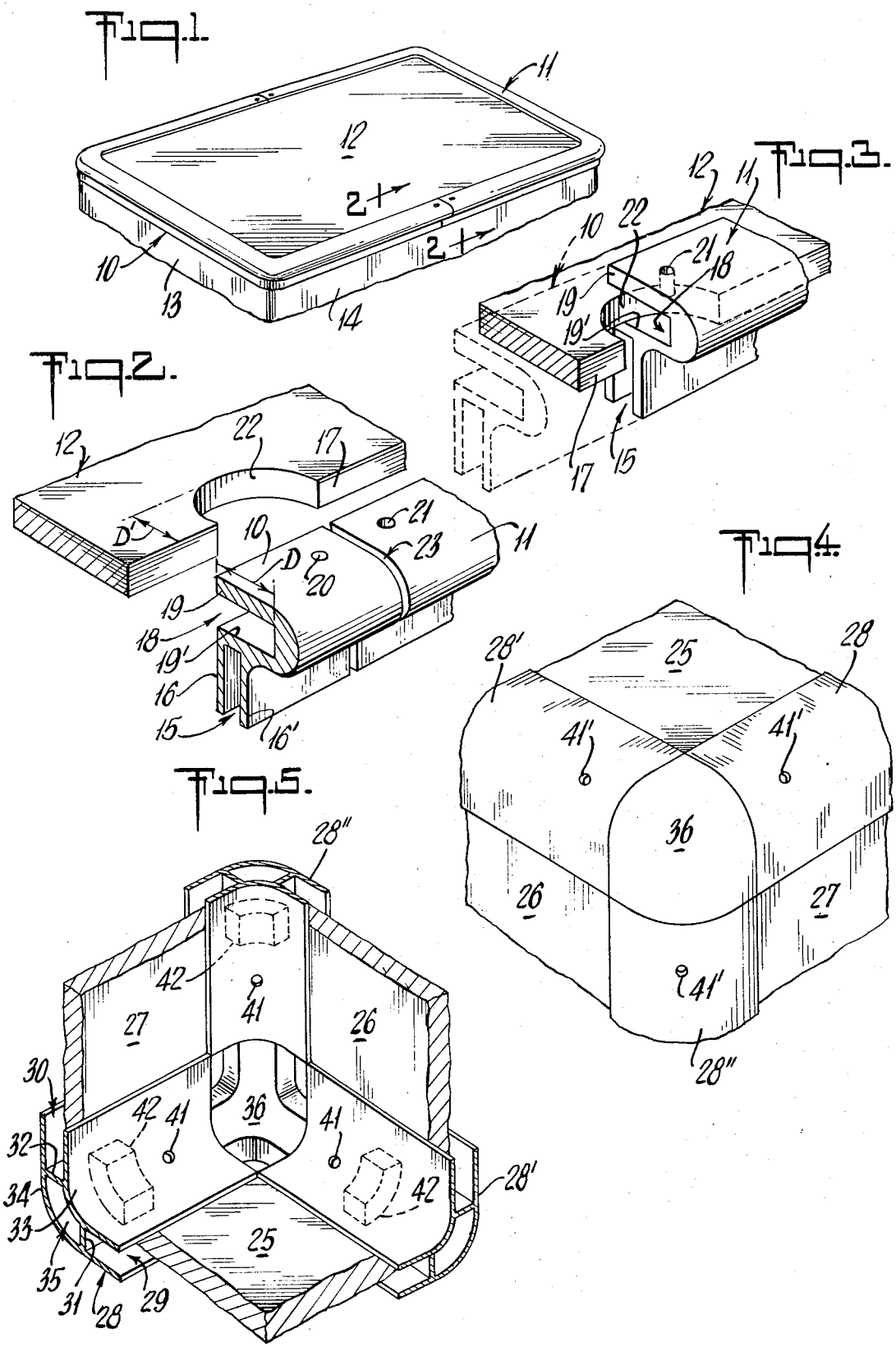

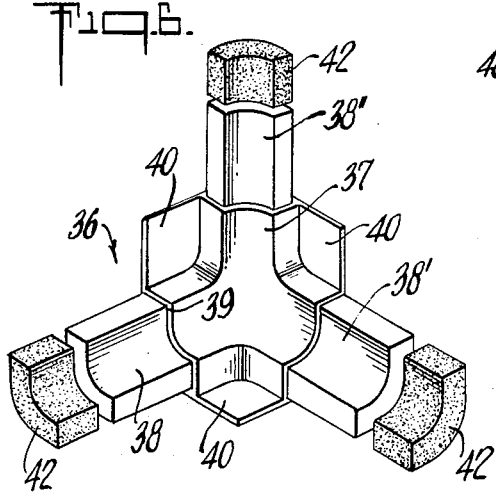
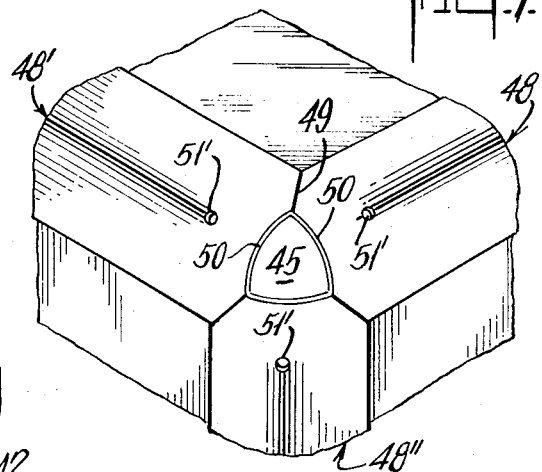
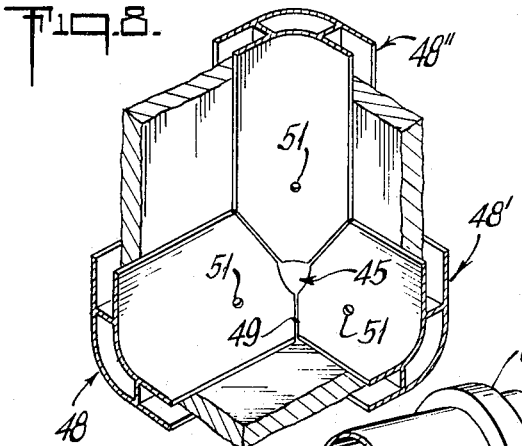
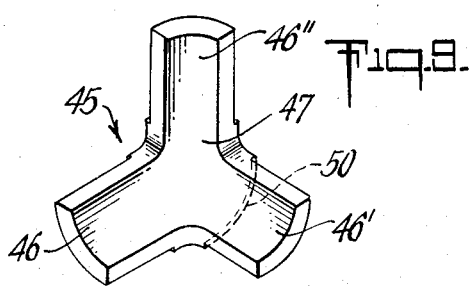
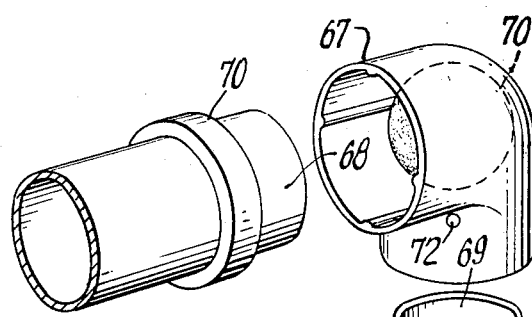
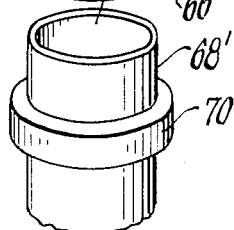

3,814,655
BONDING TECHNIQUE
Robert L. Weill, Naples, Fla., and George B. Parsons, Port Jervis, N.Y., assignors to Skydyne, Inc., Port Jervis, N.Y.
Original application Nov. 23, 1970, Ser. No. 91,819, now Patent No. 3,716,259. Divided and this application Oct. 10, 1972, Ser. No. 296,240
Int. Cl. B32b 31/00
U.S. Cl. 156—293                                7 Claims

ABSTRACT OF THE DISCLOSURE

The invention contemplates a bonded assembly of plural parts having regions of channel-socket or telescoping fit with each other. One or more small apertures are provided to vent the overlap region of such fit, and the aperture assists in the pressurized liquid-phase introduction of hardenable bonding material. Depending upon the nature of the assembly or joint, (a) the parts may be fabricated to naturally and substantially close or dam the open annulus attributable to clearance between the overlapped parts at the open end of the region of overlap, or (b) expendable rings or solid plugs may be used to confine to the overlap region the flow of injected bonding material. After such injection and flow, the bonding material is cured to hardness.

This application is a division of our copending application, Ser. No. 91,819, filed Nov. 23, 1970 now Pat. No. 3,716,259.

This invention relates to the bonded assembly of plural rigid parts having channel-socket or telescoping fit with each other. The technique and construction are particularly useful in fabricating rugged built-up corner joints, in open tubular frames, and in the corners and other joints of case constructions exemplified by those of Parsons Pat. No. 2,980,285.

In the manufacture of many cases, especially for instruments and other articles, it is essential that a tight case be formed and the case must be able to withstand rough handling, without ensuing leaks or breaks for the entrance of moisture to the inside of the case. Rivets and sealing compound have in the past been relied upon to secure and seal assembled case parts to each other at their regions of fitted overlap, but the integrity of seal is not always achieved, and the rigidity of fastening is not all that is desired. Further, attempts to use hardenable bonding materials, such as epoxy and other of the modern synthetic glues, have been subject to the same uncertainty as to just how far, and therefore how effective, the bonding and sealing action will be.

It is an object of the invention to provide a bonded construction and method which avoids or substantially reduces the aforementioned difficulties.

It is another object to provide a construction and method which, in essentially a single and relatively simple operation, assures integrity of seal and bond at the region of overlap of parts of the character indicated.

A general object is to achieve the foregoing objects with an improved construction and method which lend themselves to mass-production of high-quality products at little or no cost increment over past constructions, and which results in substantial economies through virtual elimination of article-rejection for failure to meet drop and water-immersion tests.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a fragmentary view in perspective, showing a case end utilizing a construction of the invention;

FIG. 2 is a exploded enlarged fragmentary perspective view of the parts of a joint in the structure of FIG. 1, parts at the left being shown in section taken at 2—2 in FIG. 1;

FIG. 3 is a view generally similar to FIG. 2 but with the parts assembled, prior to bonding;

FIGS. 4, 5 and 6 are fragmentary perspective views of a corner-joint construction of the invention, FIG. 4 being a view from the outside, FIG. 5 being a view from the inside, and FIG. 6 being an exploded inside view of a corner-block member and associated plug elements;

FIGS. 7, 8 and 9 are views similar to FIGS. 4, 5 and 6, respectively, to show a modified corner construction;

FIGS. 10 and 11 are exploded perspective views of further corner constructions.

Briefly stated, the invention contemplates a bonded assembly of plural parts having regions of channel-socket or telescoping fit with each other. One or more small apertures are provided to vent the overlap region of such fit, and the aperture assists in the pressurized liquid-phase introduction of hardenable bonding material. Depending upon the nature of the assembly or joint, (a) the parts may be fabricated to naturally and substantially close or dam the open annulus attributable to clearance between the overlapped parts at the open end of the region of overlap, or (b) expendable rings or solid plugs may be used to confine to the overlap region the flow of injected bonding material. After such injection and flow, the bonding material is cured to hardness.

In FIGS. 1 to 3 of the drawings, the invention is shown in application to the end of a case wherein two like and opposed molding-frame halves 10–11 define the rim of a flat top or end panel 12 and at the same time connect the end panel to a body comprised of upstanding sides 13–14. The body sides, including sides 13–14, may be molded or bent from the same single piece, received, in secured and sealed within a downwardly open channel 15. Channel 15 is defined between spaced walls 16–16' formed integrally with the rest of the molding extrusion from which elements 10–11 are cut and formed. The extrusion may be of aluminum.

One form of the invention is embodied in the joint construction involved in the end-to-end adjacent relation of the molding halves 10–11, as they both are fitted to the adjacent edge 17 of the panel 12. The molding extrusion includes a second channel 18, defined between spaced walls 19–19', and facing at a right angle to the channel 15. Short of the full depth D of channel 18, and preferably at substantially half this distance from the channel bottom, the channel wall 19 of the molding half 10 is provided with a vent aperture 20; a similarly placed aperture 21 is provided in the corresponding wall of the molding half 11. Apertures 20–21 are in a region of adjacency to each other and to the panel edge 17. The panel edge 17 is preferably locally recessed in this region, as suggested by the arcuate lobe 22, of depth D', less than the depth D of channel 18; and the distance between apertures 20–21 is preferably such as to substantially span a chord across the space defined by lobe 22, when assembled as in FIG. 3.

To complete the joint of FIGS. 2 and 3, the extruded parts 10–11 are gapped 0.090 to 0.125-inch apart, indicated at 23. This gap is temporarily bridged by a strip of masking tape. Then, a hardenable adhesive is applied in its liquid phase, under pressure, through one of the apertures 20–21, causing the volume to fill within recess 22, as permitted by air-venting at the other recess. By the time adhesive starts to flow at the venting recess, it has permeated adjacent overlapping surfaces of the upper and lower walls 19–19' and of the panel 12, around the upper and lower edges of recess 22, and along adjacent bottoms of the channels 18 of molding halves 10–11; and the tape has assured against other external flow of adhesive, while developing a continuous seal bead along the gap 23. At the same time, adhesive material has flowed downwardly at gap 23 into contact with the upper edge of side panel 14 and has filled the adjacent region of overlapping fit of panel 14 to the various edge faces of channel 15. The injected adhesive or bonding material is then cured to hardness, and the temporary masking tape is removed. There results a bond which permanently registers the adjacent ends of the molding halves 10–11 to each other, to top panel 12 and to side panel 14. The full containment of recess 22 within channel 18 assures only external exposure of the panel surfaces. And the bond fully seals the assembly against moisture, it being assumed that for remaining length of fit of panel edges to their respective channels they are sealed and secured in the customary manner, e.g., by first laying down a bead of sealant along the channel-groove bottom and by squashing the sealant bead as the panel is rammed to and riveted in home position.

FIGS. 4 to 6 illustrate application of the invention to the construction of a corner of a case, at the juncture of a top panel 25, a side panel 26, and an end panel 27, which may for example be of plywood to which outer sheets of aluminum have been laminated. Along the lengths of adjacent edges, edge rails or molding elements 28–28'–28" provide a sealed edge joint. The edge rails may be of the same extruded-aluminum stock, cut to length as appropriate. The section of this stock is shown, for the case of element 28 in FIG. 5, to comprise outwardly facing channels 29–30, defined by spaced bridges 31–32 which integrally connect inner and outer curved walls 33–34. As shown, all wall curvature, to the extent of substantially 90 degrees, occurs between bridges 31–32, to define a longitudinally extending and peripherally closed space or bore 35, of cylindrically arcuate nature. Beyond bridges 31–32, the walls 33–34 extend substantially parallel, to define channels 29–30 at substantially 90 degrees to each other. The manner of assembling and sealing panels 25–27, along their adjacent edges and in their respective channels 29–30 may be conventional and therefore need not be further described. Also, the rail 28' and its edge-fit to panels 25–26, and the rail 28" and its edge-fit to panels 26–27, may be as described in connection with rail 28 and panels 25–27.

At the corner joint, i.e., at the intersection of the longitudinal axes of rails 28–28'–28", we show a single solid corner-block member 36 having a central body 37 with integral arms 38–38'–38", projecting in the different directions of the axes of rails 28–28'–28" and telescopically fitted into the bores 35 thereof. The block member 36 may be a single casting of suitable material, such as aluminum or steel, to withstand the heavy abuse of corner impact, as in a drop test. The arms 38–38'–38" are of section reduced from that at juncture with body 37, to define a shoulder which extends radially of the axis of the particular arm, as in the case of shoulder 39 at the base end of arm 38. Around the convex outer surfaces of the arms, the shoulder 39 is continuous with the outer dome-shaped convex surface of member 36, namely, the only surface of this member visible in FIG. 4; this outer surface generally comprises a central spherical quadrant, tangentially bounded by cylindrically arcuate surfaces (on the respective axes of arms 38–38'–38") and with integral substantially flat corner elements, which appear as square walls 40 between adjacent arms (see FIG. 6); light broken lines over the exposed face of member 36 in FIG. 4 delineate the outlines of the above-described tangentially related elements of the exposed outer convex surface of member 36. To complete the description of rigid parts in FIGS. 4 and 5, a venting aperture 41 is provided in the inner wall 33 of each arm, giving radial access to bore 35 in the vicinity of arm overlap. Such apertures 41 may be drilled prior to arm assembly, and drilling preferably also proceeds through the opposite side of the bore, i.e., through outer wall 34, to define corresponding apertures 41'.

In bonding and sealing the corner joint of FIGS. 4 to 6, plugs 42 are first inserted, with interference fit, in the bores 35 of rails 38–38'–38". Plugs 42 are preferably of rigid or semi-rigid foamed plastic such as urethane foam or polystyrene foam, and they are easily fabricated from foamed sheet material, using the rail ends as "cookie cutters." In other words, the mere forced application of a rail end against such sheet material cuts the correct bore profile and establishes the desired interference-fit insertion. Subsequent assembly of the rail ends to their respective corner arms displaces plugs 42 further into their bores 35, leaving the plugs 42 adjacent the respective arm ends. Having assembled the corner elements as described and shown in FIGS. 4 and 5, and with a bead of suitable sealant applied to the square elements 40 (to lap the corners of panels 25–26–27), the bonding material, in its liquid-phase, is injected under pressure at each of the apertures 41 (or 41'). As the bonding material flows, it is limited by plugs 42 at one end and by shoulders 39 at the other, and the aperture not used for injection serves as a vent. The normal clearance between arm 38 and its bore 35 is in the order of 0.05 to 0.10 inch, and depends *inter alia* upon viscosity and filler content of the bonding material which may be a filled epoxy resin. The injected flow is forced to divide in the respective peripheral directions to fully surround the arm 38, before appearing at the vent aperture, by which time intimate and continuous void-free contact will have been established over adjacent surfaces of arm 38, bore 35, along shoulder 39, and over the adjacent face of plug 42. Upon curing to hardness, the bonding material has established a rigid integral corner, fully sealed against any possible fluid access.

The embodiment of FIGS. 7 to 9 illustrates a construction generally similar to FIGS. 4 to 6 but employing a solid corner-block member 45 (FIG. 9) in which the projecting arms 46–46'–46" do not terminate at a continuous shoulder but rather extend continuously from the central body portion 47. Edge rails 48–48'–48" may be of the same extruded stock as rails 28–28'–28" in FIGS. 4 and 5, but in view of the more central rooting of arms 46–46'–46" to body 47, the rails 48–48'–48" are cut for mitered fit, as at 49 on the outer walls and at 49' on the inner walls.

The outside convex exposed surface of the corner-block member 45 is essentially a spherical quadrant projecting outwardly from the rest of the body 47 to define limited external shoulders 50 against which square truncations and the miter cuts of the rails abut upon assembly. Filling and venting apertures 51–51' may again be provided at regions of telescopic overlap of the arms in their respective rail bores.

To bond and secure the described assembly of FIGS. 7 to 9, the procedure of FIGS 4 to 6 may be adopted and, preferably the miter seams 49–49' are first taped, the tape being removed after filling and hardening. The result is a hardened void-free bond intimately relating adjacent overlapped surfaces of the arms and their bores, as well as the square-cut rail ends (at shoulders 50), adjacent surfaces of plugs (not shown), and along mitered edges. Alternatively, the taping procedure may be applied over inner apertures 51; and relying upon the venting function of outer apertures 51', a single injection of bonding material in its liquid phase may be made via the centrally exposed opening at the crotch of the assembly. In FIG. 8, this opening bears the identification 45, in that this is the only means of observing the corner-block member 45 in FIG. 8.

In the embodiment of FIGS. 10 and 11, the invention is shown in application to a three-dimensional structure which may be merely an opening assembly of frame elements. FIG. 10 illustrates a tri-axial corner and FIG. 11 a bi-axial corner. In FIG. 10, a hollow corner-block member 55 has three internally communicating sockets or openings at 56–57–58 on axes which extend in different directions and which may, for example, be mutually perpendicular. The block member 55 may be a single casting of metal or other suitable material, and the projecting tubular arms which establish the three bores 56–57–58 are shown formed with plural spaced ridges or ribs 59 extending longitudinally in each bore. The ribs 59 serves to centrally position and align the inserted rail end to make the assembly. As shown, the rails 60–60′–60″ to be received in the bores 56–57–58 are tubular. Preferably, they are of a diameter to have slight interference fit with the ribs 59, thereby adequately retaining the corner-joint assembly and permitting the bonding process to proceed. Description of the corner-block member 55 is completed by identifying a single central venting aperture 61 which may be at the crotch of the construction.

To bond the assembly of FIG. 10, and if the rails 60–60′–60″ are tubular, plugs 62 are first formed and interference-fitted into the rail bores, as by the cookie-cutting process indicated above. Additionally, an expandable annular plug or ring 63 of foamed plastic material is assembled with light interference fit to the outer surface of the rail members in the vicinity of joint connection. Upon rail insertion in the respective bores 56–57–58, the rings 63 are pushed in to snug fit with the open projecting ends of the arm of member 55, thereby sealing or substantially closing the ends of spaces between ribs 59. Next, bonding material in its liquid phase is injected via the aperture 61 to fill the interior of the member 55 and to establish intimate and continuous contact with adjacent overlapped surfaces of the rail members and their bores. The bonding material also intimately conforms to the exposed plug surfaces and extends to the dams created by rings 63. Upon curing to hardness, the rings 63 are severed and removed, and a tight sealed corner joint has been established. If desired, an economy of bonding material may be realized by first inserting spherical, cylindrical or other scrap 61 of the foamed plastic material into the volume within block 55. Placement of such material 64 in member 55 in no way affects the bond which is established at the all-important adjacent overlapping surfaces of the rails and their bores.

In FIG. 11, the construction is as described in FIG. 10, except that the corner-block member 65, which may be again a hollow casting, is provided with merely two arms 66–67, having open bores extending in two different directions, and providing the means whereby two rail members 68–68′ are interconnected according to the same technique. Thus, plugs 69 are first fitted into the respective ends of the tubular rails 68–68′, and expendable collars 70 act as dams against the otherwise open annular spaces between the telescoped parts. A further core plug 71 is shown in the central region of the block member 65, and a filling aperture 72 is also centrally located. Bonding is as described for FIG. 10.

It will be seen that the invention meets the stated objects and provides a simple technique for establishing, with greatly enhanced certainty, a secure bond and seal at the desired joint. The indicated improvements are accomplished with very little additional expense. Such expense becomes insignificant when it is realized that rejection rates for completed assemblies are reduced to substantially zero. For case constructions in which water submergence must follow severe drop-test shock, the construction and method of the invention have been highly effective.

While the invention has been described in detail for the preferred forms and methods shown, it will be understood that modifications may be made without departing from the invention.

We claim:

1. The method of making a tri-axial-joint between (a) a solid corner member having three outwardly extending arms facing in three different directions and (b) each of three rail members having longitudinal bores contoured to fit in telescoping-overlap relation with the respective arms of the corner member, which method comprises providing a venting aperture in each rail member in the vicinity of its corner-arm overlap, selecting and assembling a plug in the bore of each rail member prior to its assembly to a corner-member arm, and introducing under pressure via each aperture and into the regions of overlap a liquid-phase hardenable bonding material until the bonding material intimately conforms to overlapped adjacent surfaces of said arms and bores, and then curing said bonding material to its hardened state.

2. The method of claim 1, in which the corner member has a body with a shoulder at each arm, each shoulder extending generally radially with respect to the arm axis associated therewith, and in which the fitted end of each rail member is a square truncation and is fitted peripherally continuously against the associated shoulder of the corner member, whereby the shoulders act as dams against loss of liquid-phase bonding material and further whereby the bonding material is more assuredly confined essentially only to regions of telescoping overlap.

3. The method of claim 2, in which a second venting aperture is provided in each rail member in the vicinity of its corner-arm overlap, the first and second apertures of each rail member being on generally opposite sides of the arm overlapped thereby, whereby liquid-phase bonding material may for each overlap region be introduced via one of the apertures and vented at the other, thereby assuring peripherally continuous integrity of bonding material at at least one longitudinal location in the region of overlap.

4. The method of making a tri-axial joint between (a) a hollow corner member having three communicating outwardly extending sockets facing in three different directions and (b) each of three rail members having ends received in telescoping-overlap relation within the respective sockets of the corner member, which method comprises providing a venting aperture in the body of the corner member in region of convergence of the socket axes, selecting and assembling a separate ring in peripherally continuous interference-fit relation with the external surface of each fitted end of said rail members, each of said rings being snug against the adjacent socket end of said corner member when said rails are assembled thereto, whereby said rings may act as annular dams against loss of liquid-phase bonding material from the regions of rail-socket overlap, introducing under pressure via the aperture and into the socketed regions of rail-member overlap a liquid-phase hardenable bonding material until the bonding material intimately conforms to overlapped adjacent surfaces of said members, and then curing said bonding material to its hardened state.

5. The method of making a tri-axial joint between (a) a corner member having three outwardly extending arms facing in three different directions and (b) each of three hollow rail members having ends received in telescoping socketed overlap relation within the respective arms of the corner member, which method comprises providing a venting aperture in each of the rail members in the region of socketed overlap with an arm axis, selecting and assembling a separate plug to the fitted end of the bore of each rail member prior to assembly to the corner member, introducing under pressure via the apertures and into the socketed regions of rail-member overlap a liquid-phase hardenable bonding material until the bonding material intimately conforms to overlapped adjacent surfaces of said members, and then curing said bonding material to its hardened state.

6. The method of making a joint between (a) a hollow connecting member having a plurality of communicating outwardly extending sockets facing in different directions and (b) each of a corresponding plurality of rail members having ends received in telescoping-overlap relation within the respective sockets of the connecting member, which method comprises providing a venting aperture in the body of the connecting member in the region between rail-receiving ends of the sockets, selecting and assembling a separate ring in peripherally continuous interference-fit relation with the external surface of each fitted end of said rail members, each of said rings being snug against the adjacent socket end of said connecting member when said rails are assembled thereto, whereby said rings may act as annular dams against loss of liquid-phase bonding material from the regions of rail-socket overlap, introducing under pressure via the aperture and into the socketed regions of rail-member overlap a liquid-phase hardenable bonding material until the bonding material intimately conforms to overlapped adjacent surfaces of said members, and then curing said bonding material to its hardened state.

7. The method of making a joint between (a) a connecting member having a plurality of outwardly extending arms facing in different directions and (b) each of a corresponding plurality of hollow rail members having ends received in telescoping socketed overlap relation within the respective arms of the connecting member, which method comprises providing a venting aperture in each of the rail members in the region of socketed overlap with an arm axis, selecting and assembling a separate plug to the fitted end of the bore of each rail member prior to assembly to the corner member, introducing under pressure via the apertures and into the socketed regions of rail-member overlap a liquid-phase hardenable bonding material until the bonding material intimately conforms to overlapped adjacent surfaces of said members, and then curing said bonding material to its hardened state.

References Cited
UNITED STATES PATENTS

| | | | |
|---|---|---|---|
| 2,040,126 | 5/1936 | Grieve | 144—309 |
| 3,455,625 | 7/1969 | Brumley et al. | 350—96 |
| 2,926,941 | 3/1960 | Thompson | 287—54 |

WILLIAM A. POWELL, Primary Examiner

B. J. LEITTEN, Assistant Examiner

U.S. Cl. X.R.

52—614, 627; 156—294, 305; 161—44